United States

Dombro

[11] 3,716,516

[45] Feb. 13, 1973

[54] FLAME RETARDANT COMPOSITIONS OF MATTER

[76] Inventor: Robert A. Dombro, Ten UOP Plaza, Algonquin & Mt. Prospect Roads, Des Plaines, Ill.

[22] Filed: Nov. 8, 1971

[21] Appl. No.: 196,774

Related U.S. Application Data

[63] Continuation-in-part of Ser. No. 772,045, Oct. 30, 1968, Pat. No. 3,661,937, which is a continuation-in-part of Ser. No. 408,673, Nov. 3, 1964, Pat. No. 3,452,083.

[52] U.S. Cl. ..........260/45.8 A, 106/15 FP, 117/136, 117/138.5, 260/2.5 FP, 260/2.5 AJ, 260/45.7 P, 260/45.75 B, 260/45.75 K, 260/45.85 V
[51] Int. Cl. ....................C08f 45/100, C08g 51/100
[58] Field of Search......260/45.85 V, 45.8 A, 2.5 FP, 260/2.5 AJ, 346.2; 106/15 FP; 117/136, 138.5

[56] References Cited

UNITED STATES PATENTS 3,465,006  9/1969  Schmerling.......................260/346.3

*Primary Examiner*—Donald E. Czaja
*Assistant Examiner*—V. P. Hoke
*Attorney*—James R. Hoatson, Jr. et al.

[57] ABSTRACT

Novel flame retardant compositions of matter comprising admixture of a polymeric compound and a halo-substituted dihydroxypolyhalomethanonaphthalenedicarboxylic acid or anhydride thereof as exemplified by an admixture of polypropylene and 1,4-dihydroxy-5,6,7,8,9,9-hexachloro-1,2,3,4,4$a$,5,8,8$a$-octahydro-5,8-methano-2,3-naphthanedicarboxylic acid.

11 Claims, No Drawings

FLAME RETARDANT COMPOSITIONS OF MATTER

CROSS-REFERENCE TO RELATED APPLICATIONS

This application is a continuation-in-part of my co-pending application Ser. No. 772,045 filed Oct. 30, 1969 now U.S. Pat. No. 3,661,937 issued May 9, 1972 which was a continuation-in-part of my co-pending application Ser. No. 408,673 filed Nov. 3, 1964 now U.S. Pat. No. 3,452,083, issued June 24, 1969.

This invention relates to novel flame retardant compositions of matter comprising a mixture of polymeric compounds and a halo-substituted dihydroxypolyhalomethanonaphthalenedicarboxylic acid or anhydride thereof. Particularly speaking the invention relates to these compositions of matter which possess certain desirable physical characteristics such as flame retardancy, etc.

In the past relatively few years the use of certain polymeric compositions of matter such as plastics and resins has increased with great degree. In view of the fact that these plastics or resins are replacing materials heretofore utilized in certain places involving an excessive amount of heat and possible exposure to flame, it is necessary that these synthetic compounds possess the capability of being able to withstand the aforementioned effects of heat and/or flame. The halo substituted 1,4-dihydroxy-5,6,7,8,9,9-hexachloro-1,2,3,4,4a,5,8,8a-octahydro-5,8-methano-2,3-naphthalenedicarboxylic acid or anhydride thereof are useful as additives to plastics, polymers, co-polymers, terpolymers, resins, polycondensates, elastomers, rubbers, wood, paper, textiles and fibers, both naturally occurring and synthetic in nature, coatings, paints, varnishes, leather, foams, cellulose acetate butyrate, ethyl cellulose, cellulose propionate, polyolefins such as polyethylene and polyethylene co-polymers, polypropylene and polypropylene co-polymers, polystyrenes, polystyrene co-polymers, polyvinyl acetate or alcohol and co-polymers, polyvinyl chloride, and co-polymers, polyvinylidene chloride, and co-polymers, polyesters, polyurethane, polyphenyl ethers, styrenated polyphenyl ethers, polycarbonates, polyamides, polyoxymethylenes, polyalkylene oxides such as polyethylene oxide, polyacrylates, polymethacrylates and their co-polymers with styrene, butadiene, acrylonitrile, etc., epoxy resins, acrylonitrile-butadiene-styrene formulations (commonly known as ABS), polybutylene and acrylic ester-modified-styrene-acrylonitrile (ASA), etc., whereby the desirable physical characteristics of flameproofing or fire retardancy will be imparted to the aforementioned materials. By utilizing a halo substituted 1,4-dihydroxy-5,6,7,8,9,9-hexachloro-1,2,3,4,4a,5,8,8a-octahydro-5,8-methano-2,3-naphthalenedicarboxylic acid or anhydride thereof of the type hereinafter set forth in greater detail it will be found that the finished composition of matter will possess the desirable characteristics to a greater degree than will be possessed by polymeric compounds which do not contain the acids or anhydrides. This particular physical characteristic will possess special advantages when preparing plastics, polymers, resins, various rubbers, textiles, etc., which will be utilized in places which may be subjected to excessive heat or to the action of a possible flame, such places including architectural panels for construction work, wall plugs for electrical connections, soundproofing material in walls, ceilings, etc., under hood automotive use, heater ducts, cable and wire coatings, TV-cabinets, appliance housing, car or airplane interior components, automotive vents, etc., boat interiors or exteriors, cushions for various vehicle seats such as airplane seats, automobile seats, but seats, etc. In addition, the compound when utilized as a constituent of paint, lacquer, varnishes or protective coatings, films, etc., will also impart a flame resistance to these compounds and, therefore, render them commercially attractive as articles of commerce.

It is therefore an object of this invention to provide novel compositions of matter which possess desirable physical properties.

A further object of this invention is to provide novel compositions of matter which will possess the desirable physical characteristics of flameproofing and fire retardancy when utilized in various shapes and forms.

In one aspect an embodiment of this invention is found in a flame retardant composition of matter comprising polymeric compounds and halo-substituted dihydroxypolyhalomethanonaphthalenedicarboxylic acid or anhydride which possesses the generic formula:

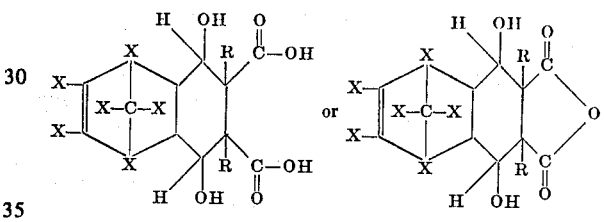

in which each R is independently selected from the group consisting of hydrogen, alkyl, aryl and halogen and each X is independently selected from the group consisting of hydrogen and halogen, at least 2 X's being halogen, the aforesaid halogen being either chlorine or bromine.

A specific embodiment of this invention is found in a flame retardant composition of matter comprising a mixture of polypropylene and 1,4-dihydroxy-5,6,7,8,9,9-hexachloro-1,2,3,4,4a,5,8,8a-octahydro-5,8-methano-2,3-naphthalenedicarboxylic acid or anhydride.

Other objects and embodiments will be found in the following further detailed description of the present invention.

As hereinbefore set forth the present invention is concerned with novel flame retardant compositions of matter which comprise an admixture of a polymeric compound and a halo-substituted dihydroxypolyhalomethanonaphthalenedicarboxylic acid or anhydride thereof. The halo-substituted dihydroxypolyhalomethanonaphthalenedicarboxylic acids or anhydrides thereof which comprise one component of the novel flame retardant composition of matter are obtained in a three-step process. The first step of the process involves the reaction of furan with an olefinic dicarboxylic acid or anhydride thereof. Examples of olefinic dicarboxylic acids or anhydrides thereof which may be used include maleic acid, maleic anhydride, fumaric acid, chloromaleic anhydride, citraconic acid, diphenylmaleic acid, mesaconic acid, etc. For purposes of the present specification, the term "olefinic dicarboxylic acid and anhydride" will refer to a dicarboxylic acid containing only one ethylenic double bond and comprising only carbon, hydrogen and oxygen atoms. Furan and the olefinic dicarboxylic acid or anhydride are condensed at temperatures ranging from about 0° to about 200° C. or more and preferably in a range of from about 25° to about 100° C. The two starting materials can be admixed per se or, if so desired, solutions of the starting materials in substantially inert organic solvents such as n-pentane solutions, n-hexane solutions, benzene solutions, toluene solutions, ether solutions, etc. may be admixed.

The product resulting from the aforementioned condensation, namely, an epoxy tetrahydrophthalic acid, anhydride, or homolog thereof, is then further condensed with a halo-substituted cycloalkadienic compound to form the desired reaction product. For purposes of this invention, the term "halocycloalkadiene" as used in the specification will refer to both mono- and polyhalo-substituted cycloalkadienes. Examples of the halo-substituted cycloalkadienes which may be used in the process of this invention include chloro-substituted 1,3-cyclopentadienes (hereinafter referred to as cyclopentadienes) such as 1-chlorocyclopentadiene, 2-chlorocyclopentadiene, 1,2-dichlorocyclopentadiene, 1,5-dichlorocyclopentadiene, 1,2,3-trichlorocyclopentadiene, 1,2,3,4-tetrachlorocyclopentadiene, 1,2,3,4,5-pentachlorocyclopentadiene, hexachlorocyclopentadiene; bromo-substituted cyclopentadienes such as 1-bromocyclopentadiene, 1,2-dibromocyclopentadiene, 1,2,3-tribromocyclopentadiene, 1,2,3,4-tetrabromocyclopentadiene, 1,2,3,4,5-pentabromocyclopentadiene, hexabromocyclopentadiene, etc.

The condensation reaction between the epoxy tetrahydrophthalic acid, anhydride or homolog thereof and the halo-substituted cycloalkadiene is of the Diels-Alder type and may be effected at elevated temperatures in the range of from about 50° to about 250° C., the preferred range being from about 100° to about 200° C. In addition, pressures ranging from atmospheric up to about 100 atmospheres or more may be used, the pressure being sufficient so as to maintain a major portion of the reactants in the liquid phase. If so desired, this condensation may be effected in the presence of an inert organic solvent including aromatic solvents such as benzene, toluene, o-xylene, m-xylene, p-xylene, ethylbenzene, etc.; saturated paraffins and cycloparaffins such as n-pentane, n-hexane, n-heptane, cyclopentane, methylcyclopentane, cyclohexane, cycloheptane, etc.; ethers such as dimethyl ether, diethyl ether, dipropyl ether, etc.; or acetone, etc., the aromatic solvents usually comprising the preferred solvents.

The halo-substituted polyhydroepoxymethanonaphthalenedicarboxylic acid or anhydride thereof which is prepared according to the above paragraph is then treated with an oxygenated acid, ether inorganic or organic in nature, to prepare the desired product. Examples of oxygenated acids which may be used include inorganic acids such as sulfuric acid, polyphosphoric acid, triphosphoric acid, tetraphosphoric acid, orthophosphoric acid, pyrophosphoric acid, etc.; organic acids such as methanesulfonic acid, ethanesulfonic acid, benzenesulfonic acid, toluenesulfonic acid, etc. The treatment of the halo-substituted polyhydroepoxymethanonaphthalenedicarboxylic acid or anhydride thereof with the aforementioned acid is usually effected at elevated temperatures ranging from about 30° up to about 150° C. or more and preferably in a range of from about 50° to about 100° C. The resulting product which comprises the desired compound utilizable as a monomer for the preparation of flame-retardant plastics or resins is generically referred to as a halo-substituted dihydroxypolyhydromethanonaphthalenedicarboxylic acid.

To illustrate the aforementioned steps hereinbefore described, the preparation of 1,4-dihydroxy-5,6,7,8,9,9-hexachloro-1,2,3,4,4a,5,8,8a-octahydro-5,8-methano-2,3-naphthalenedicarboxylic acid is shown in a typical reaction scheme hereinafter set forth utilizing furan and maleic anhydride as the starting materials, treating the first condensation product with hexachlorocyclopentadiene and thereafter treating the resultant product with sulfuric acid.

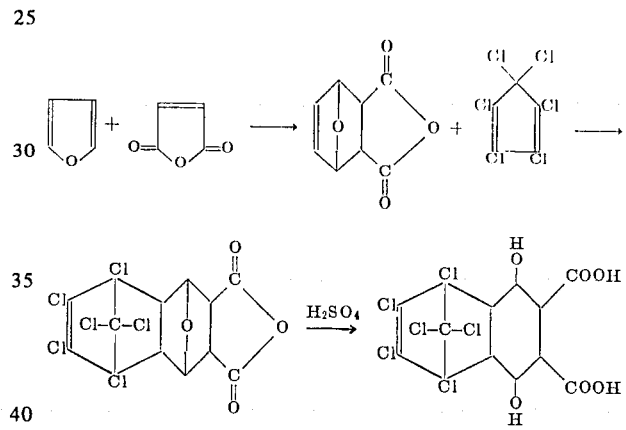

The process for preparing the aforementioned acids or anhydrides thereof may be effected in any suitable manner and may comprise either a batch or continuous type operation. For example, when a batch type operation is used, a quantity of furan and the olefinic dicarboxylic acid or anhydride thereof is placed in an appropriate apparatus, preferably a condensation vessel, at the proper operating conditions of temperature and allowed to condense. Following this, the epoxy tetrahydrophthalic acid or anhydride is recovered by conventional means such as fractional distillation, crystallization, etc., and placed in a second condensation apparatus along with a halo-substituted cycloalkadiene, this condensation being effected in the presence of an inert organic solvent. The condensation vessel is heated to the desired temperature, and, after a predetermined residence time, the vessel is cooled and the halo-substituted polyhydroepoxymethanonaphthalenedicarboxylic acid or anhydride thereof is separated from the unreacted starting materials by conventional means and recovered. This product is then treated with an oxygenated acid in an appropriate vessel at temperatures ranging from about 50° to about 100° C. and the desired product, after completion of the desired residence time, is recovered.

It is also contemplated that the acid or anhydride component of the novel flame retardant compositions of matter of the present invention may be prepared by utilizing a continuous type of operation. When such type of operation is used, the starting materials comprising furan and the olefinic dicarboxylic acid or anhydride thereof are continuously charged to a reaction vessel maintained at the proper operating conditions of temperature and pressure. If so desired, this reaction may be effected in the presence of an inert organic solvent such as a low molecular weight ether. The resultant epoxy tetrahydrophthalic anhydride is continuously withdrawn from the reaction vessel and charged to a second condensation vessel which is also maintained at the proper operating conditions of temperature and pressure. In addition, the halo-substituted cycloalkadiene is continuously charged to this second reaction vessel which is maintained at the proper operating conditions of temperature and pressure through a separate line. Alternatively, the halo-substituted cycloalkadiene may be admixed with an inert organic solvent, thereafter further admixed with the epoxy tetrahydrophthalic anhydride and the mixture charged to the reactor in a single stream. The resultant halo-substituted polyhydroepoxymethanonaphthalenedicarboxylic acid or anhydride is continuously withdrawn and charged to a treating vessel wherein it undergoes treatment with an acid of the type hereinbefore set forth in greater detail at temperatures ranging from 50° to about 100° C. The reactor effluent is continuously withdrawn from this vessel and charged to a separator wherein the desired product comprising the halo-substituted dihydroxypolyhydromethanonaphthalenedicarboxylic acid is separated from unreacted starting materials and recovered. It is to be understood that in a continuous process of this type in each case the reactor effluent from the first and second condensation zones, as well as the third treating zone, is subjected to a separation wherein the desired product from each zone is separated from the unreacted starting materials in each step, the latter being recycled to form a portion of the feed stock to each respective reaction zone.

Examples of halo-substituted dihydroxypolyhydromethanonaphthalenedicarboxylic acids or anhydrides thereof in which the nuclear carbon atoms in the 1,4,4a, and 8a positions on the ring are saturated. In addition, the hydroxy substituents of the compound are situated on the saturated ring at the 1 and 4 positions of the compound. Specific representative examples of these compounds will include 1,4-hydroxy-5,8-dichloro-1,2,3,4,4a,5,8,8a-octahydro-5,8-methano-2,3-naphthalenedicarboxylic acid, 1,4-dihydroxy-5,8-dibromo-1,2,3,4,4a,5,8,8a-octahydro-5,8-methano-2,3- -naphthalenedicarboxylic acid, 1,4-dihydroxy-6,7-dichloro-1,2,3,4,4a,5,8,8a-octahydro-5,8-methano-2,3-naphthalenedicarboxylic acid, 1,4-dihydroxy-6,7-dibromo-1,2,3,4,4a,5,8,8a-octahydro-5,8-methano-2,3-naphthalenedicarboxylic acid, 1,4-dihydroxy,5,6,7,8-tetrachloro-1,2,3,4,4a,5,8,8a-octahydro-5,8-methano-2,3-naphthalenedicarboxylic acid, 1,4-dihydroxy-5,6,7,8-tetrabromo-1,2,3,4,4a,5,8,8a-octahydro-5,8-methano-2,3-naphthalenedicarboxylic acid, 1,4-dihydroxy-5,6,7,8,9,9-hexachloro-1,2,3,4,4 a,5,8,8a-octahydro-5,8-methano-2,3-naphthalenedicarboxylic acid, 1,4-dihydroxy-5,6,7,8,9,9-hexabromo-1,2,3,4,4a,5,8,8a-octahydro-5,8-methano-2,3-naphthalenedicarboxylic acid, 1,4-dihydroxy-2-methyl-5,6,7,8,9,9-hexachloro-1,2,3,4,4a,5,8,8-octahydro-5,8-methano-2,3-naphthalenedicarboxylic acid, 1,4-dihydroxy-2-methyl-5,6,7,8,9,9-hexachloro-1,2,3,4,4a,5,8,8a-octahydro-5,8-methano-2,3-naphthalenedicarboxylic anhydride, 1,4-dihydroxy-2-ethyl-5,6,7,8,9,9-hexachloro-1,2,3,4,4a,5,8,8-octahydro-5,8-methano-2,3-naphthalenedicarboxylic anhydride, 1,4-di-hydroxy-2-propyl-5,6,7,8,9,9-hexachloro-1,2,3,4,4a,b 5,8,8a-octahydro-5,8-methano-2,3-naphthalenedicarboxylic anhydride, 1,4-dihydroxy-2-butyl-5,6,7,8,9,9-hexachloro-1,2,3,4,4a,5,8,8a-octahydro-5,8-methano-2,3-naphthalenedicarboxylic anhydride, 1,4-dihydroxy-2,3-dimethyl-5,6,7,8,9,9-hexachloro-1,2,3,4,4a,5,8,8a-octahydro-5,8-methano-2,3-naphthalenedicarboxylic acid, 1,4-dihydroxy-2,3-dimethyl-5,6,7,8,9,9-hexachloro-1,2,3,4,4a,5,8,8a-octahydro-5,8-methano-2,3-naphthalenedicarboxylic anhydride, 1,4-dihydroxy-2,3-diethyl-5,6,7,8,9,9-hexachloro-1,2,3,4,4a,5,8,8a-octahydro-5,8-methano-2,3-naphthalenedicarboxylic acid, 1,4-dihydroxy-1,3-dipropyl-5,6,7,8,9,9-hexachloro-1,2,3,-4,4a,5,8,8a-octahydro-5,8-methano-2,3 -naphthalenedicarboxylic anhydride, 1,4-dihydroxy-2,3-dibutyl-5,6,7,8,9,9-hexachloro-1,2,3,4,4a,5,8,8-octahydro-5,8-methano-2,3-naphthalenedicarboxylic anhydride, 1,4-dihydroxy-2-phenyl-5,8-dichloro-1,2,3,4,4a,5,8,8-octahydro-5,8-methano-2,3-naphthalenedicarboxylic acid, 1,4-dihydroxy-2-phenyl-5,8-dichloro-1,2,3,4,-4a,5,8,8a-octahydro-5,8-methano-2,3-naphthalenedicarboxylic anhydride, 1,4-dihydroxy-2-benzyl-5,6,7,8,9,9-hexachloro-1,2,3,4,4a,5,8,8-octahydro-5,8-methano-2,3-naphthalenedicarboxylic acid, 1,4-dihydroxy-2-p-tolyl-5,6,7,8,9,9-hexachloro-1,2,3,4,4a,5,8,8a-octahydro-5,8-methano-2,3-naphthalenedicarboxylic acid, 1,4-dihydroxy-2,3-diphenyl-5,6,7,8,9,9-hexachloro-1,2,3,4,4a,5,8,8-octahydro-5,8-methano-2,3-naphthalenedicarboxylic acid, 1,4-dihydroxy-2,3-dibenzyl-5,6,7,8,9,9-hexachloro-1,2,3,4,4a,5,8,8a-octahydro-5,8-methano-2,3-naphthalenedicarboxylic acid, 1,4-dihydroxy-2,5,6,7,8-pentachloro-1,2,3,4,4 a,5,8,8a-octahydro-5,8-methano-2,3-naphthalenedicarboxylic acid, 1,4-dihydroxy-2,5,6,7,8-pentachloro-1,2,3,4,4a,5,8,8a-octahydro-5,8-methano-2,3-naphthalenedicarboxylic anhydride, 1,4-dihydroxy-2,3,5,6,7,8-hexachloro-1,2,3,4a,5,8,8a-octahydro-5,8-methano-2,3-naphthalenedicarboxylic acid, 1,4-dihydroxy- 2,3,5,6,7,8-hexachloro-1,2,3,4,4a,5,8,8a-octahydro-5,8-methano-2,3-naphthalenedicarboxylic anhydride, 1,4-dihydroxy-2,3,5,6,7,8,9,9-octahydro-1,2,3,4,4a,5,8,8a-octahydro-5,8-methano-2,3-naphthalenedicarboxylic acid, 1,4-dihydroxy-2,3,5,6,7,8,9,9-octachloro-1,2,3,4,4a,5,8,8a-octahydro-5,8-methano-2,3-napthalenedicarboxylic anhydride, etc. the corresponding dibromo, tribromo, tetrabromo, pentabromo, hexabromo, octabromo, etc. acids and anhydrides. It is to be understood that the aforementioned acids and anhydrides are only representative of the one component of the novel composition of matter of the present invention, and that said invention is not necessarily limited thereto.

The aforementioned acids and anhydrides which have been prepared according to the processes hereinbefore set forth may be utilized as monomers or additives for plastics, resins, polymers, copolymers, textiles, naturally occurring products such as leather, wood or paints, coatings, etc. to form novel compositions of matter which posses desirable physical properties such as flame retardants or fire resistants. In addition to imparting the desirable characteristics of flame retardancy the final composition of matter may also possess additional advantageous physical properties such as an increased stability against deterioration, weathering, or aging which have been induced by chemical, physical, biological agents, radiation, etc. As one example thereof the halo-substituted 1,4-dihydroxypolyhydromethanonaphthalenedicarboxylic acids or anhydrides thereof may be used as additives with polymeric olefins such as polypropylene or polyethylene. In addition, the polymeric olefins will have a higher ignition point as well as a high degree of flame retardancy. Another example of polymeric products which may be treated with the novel compositions of matter of the present invention will include epoxy resins such as the condensation product of epichlorohydrin and bis-phenol-A. The epoxy resin, in an uncured state, will usually be thermoplastic and may range from low viscosity liquids to high melting point brittle solids. The resins may be cured by utilizing a curing agent such as phthalic anhydride and thereafter admixing the resulting mixture with a halo-substituted 1,4-dihydroxypolyhydromethanonaphthalenedicarboxylic acid or anhydride thereof of the type hereinbefore set forth in greater detail. Thereafter, the mixture will be cured by treatment at an elevated temperature for a predetermined period of time. The resultant product will have the physical characteristics thereof altered to their desirable values as pertains to color stability, flame retardancy, etc., and thus may be utilized for various purposes such as floor surfacings, coatings, etc. Other types of polymeric compounds which may be treated with the novel compositions of matter of the present invention will include polyphenyl ethers (polyphenylene oxides) which have been modified by treatment with styrene, etc.

In addition, it is also contemplated that the compounds may also be utilized as components of finished plastics or resins which will also have the physical characteristics therefor altered in such a manner so that the finished product will possess any desirable properties such as being fire resistant, flame retardant, stable as pertains to color deterioration, etc. The monomers comprising the halo-substituted 1,4-dihydroxypolyhydromethanonaphthalenedicarboxylic acids or anhydrides thereof may be polymerized to form unsaturated halogenated polyesters, or they may be co-polymerized via the dicarboxylic acid or anhydride functions with di-, tri-, etc., hydroxy compounds such as ethylene glycol, propylene glycol, butylene glycol, diethylene glycol, dipropylene glycol, hydroquinone, catechol, resorcinol, etc., glycerol, pyrogallol, phloroglucinol, etc. and via the dihydroxy function with di-, tri-, etc., carboxylic acids such as oxalic acid, malonic acid, succinic acid, glutaric acid, etc., tricarballylic acid, etc., phthalic acids, mellitic acids, etc. and anhydrides such as maleic anhydride, succinic anhydride, glutaconic anhydride, phthalic anhydride, etc. to form polyesters. These polyesters will contain an unsaturated portion of the molecule which will allow further polymerization, said further polymerization being initiated by peroxide or air drying. The polyesters thus prepared may comprise low molecular weight unsaturated compounds which can then be epoxidized and used as stabilizing plasticizers for polyvinyl chloride resins. It is also contemplated that the unsaturated polyester may be further reacted with vinyl monomers such as styrene to form compounds which are utilizable as thermal setting resins. If the polyester resin contains —OH terminals, it may be admixed with a diisocyanate such as, for example, tolylene diisocyanate to form polyurethane intermediates which may then be formed by the addition of a foaming agent such as water, tertiary alcohols, etc. to form the desired polyurethane foams. The preparation of the polyester plastic or resin may be effected at temperatures ranging from room temperature up to about 300° C. for a residence time ranging from a few minutes up to about 25 hours, the residence time being inversely proportional to the temperature at which the reaction is carried out.

The novel compositions of matter which possess the desired physical properties of flame retardancy may be compounded by admixing the polymeric compound and the aforementioned halo-substituted dihydroxypolyhydromethanonaphthalenedicarboxylic acid or anhydride thereof in any conventional manner known in the art. For example, depending upon the particular physical form of the polymeric compound, the two components of the finished composition of matter may be physically admixed in any manner such as by being admixed in a mixer, by milling, by extrusion through a suitable apparatus subsequent to admixing, by dissolving the two compounds in a mutually miscible solvent, etc., the only criterion which must be met in forming the final composition of matter being that the two components of the composition are so thoroughly admixed in such a manner so as to impart a uniform degree of the desired physical characteristics such as flame retardancy, stability, etc. throughout the entire final composition of matter. The halo-substituted 1,4-dihydroxypolyhalomethanonaphthalenedicarboxylic acid or anhydride thereof will be present in the finished composition of matter in an amount in the range of from about 5 percent to about 50 percent by wt. of the finished product while the polymeric compound will be present in an amount ranging of from about 50 percent to about 90 percent by wt. In addition, it is also contemplated within the scope of this invention that further improvement in the flame retardant characteristics may be imparted by the use of synergistic quantities of other flame retardants such as phosphorous, tin and/or antimony-containing compounds. Specific examples of suitable compounds will include antimony trioxide, tin trioxide, dibutyl tin maleate, trialkoxy antimony derivatives, phosphate and phosphite esters, phosphines, boron-containing materials, etc.

Specific examples which are representative of the novel compositions of matter of the present invention which comprise a polymeric compound and a polyhalosubstituted dihydroxypolyhalomethanonaphthalenedicarboxylic acid compound possess excellent flame retardant properties will include polyethylene and 1,4-dihydroxy-5,6,7,8,9,9-hexachloro-1,2,3,4,4a-5,8,8a-octahydro-5,8-methano-2,3-naphthalenedicarboxylic acid, polypropylene and 1,4-dihydroxy-5,6,7,8,9,9-hexachloro-1,2,3,4,-4a5,8,8a-octahydro-5,8-methano-2,3-naphthalenedicarboxylic acid, ABS and 1,4-dihydroxy-5,6,7,8,9,9-hexachloro-1,2,3,4,4a,5,8,8a-octahydro-5,8-methano-2,3-naphthalenedicarboxylic acid, polyester and 1,4-dihydroxy-5,6,7,8,9,9-hexachloro-1,2,3,4,4a,5,8,8a-octahydro-5,8-methano-2,3-naphthalenedicarboxylic acid, polyisoprene and 1,4-dihydroxy-5,6,7,8,9,9-hexachloro-1,2,3,4,4,a,5,8,8a-octahydro-5,8-methano-2,3-naphthalenedicarboxylic acid, rubber and 1,4-dihydroxy-5,6,7,8,9,9-hexachloro-1,2,3,4,4a,5,8,8a-octahydro-5,8-methano-2,3-naphthalenedicarboxylic acid, epoxy resin and 1,4-dihydroxy-5,6,7,8,9,9-hexachloro-1,2,3,4,4a,5,8,8a-octahydro-5,8-methano-2,3-naphthalenedicarboxylic acid, polyphenylene oxide and 1,4-dihydroxy-5,6,7,8,9,9-hexachloro-1,2,3,4,4a,5,8,8a-octahydro-5,8-methano-2,3-naphthalenedicarboxylic acid, polyethylene and 1,4-dihydroxy-5,6,7,8-tetrachloro-1,2,3,4,4a-5,8,8a-octahydro-5,8-methano-2,3-naphthalenedicarboxylic anhydride, polypropylene and 1,4-dihydroxy-5,6,7,8-tetrachloro-1,2,3,4,4a-5,8,8a-octahydro-5,8-methano-2,3-naphthalenedicarboxylic anhydride, ABS and 1,4-dihydroxy-5,6,7,8-tetrachloro-1,2,3,4,4a-5,8,8a-octahydro-5,8-methano-2,3-naphthalenedicarboxylic anhydride, polyester and 1,4-dihydroxy-5,6,7,8-tetrachloro-1,2,3,-4,4a,5,8,8a-octahydro-5,8-methano-2,3-naphthalenedicarboxylic anhydride, polyisoprene and 1,4-dihydroxy-5,6,7,8-tetrachloro-1,2,3,4,4a,5,8,8a-octahydro-5,8-methano-2,3-naphthalenedicarboxylic anhydride, epoxy resin and 1,4-dihydroxy-5,6,7,8-tetrachloro-1,2,3,4,4a,5,8,8a-octahydro-5,8-methano-2,3-naphthalenedicarboxylic anhydride, polyphenylene oxide and 1,4-dihydroxy-5,6,7,8-tetrachloro-1,2,3,4,4a,5,8,8a-octahydro-5,8-methano-2,3-naphthalenedicarboxylic anhydride, polyethylene and 1,4-dihydroxy-2,3-dimethyl-1,2,3,4,4a,5,8,8a-octahydro-5,8-methano-2,3-naphthalenedicarboxylic acid, polypropylene and 1,4-dihydroxy-2,3-dimethyl-1,2,3,4,4a,5,8,8a-octahydro-5,8-methano-2,3-naphthalenedicarboxylic acid, ABS and 1,4-dihydroxy-2,3-dimethyl-1,2,3,4,4a,5,8,8a-octahydro-5,8-methano-2,3-naphthalenedicarboxylic acid, polyester and 1,4-dihydroxy-2,3-dimethyl-1,2,3,4,4a,5,8,8a-octahydro-5,8-methano-2,3-naphthalenedicarboxylic acid, polyisoprene and 1,4-dihydroxy- 2,3-dimethyl-1,2,3,4,4a,5,8,8-octahydro-5,8-methano-2,3-naphthalenedicarboxylic acid, epoxy resin and 1,4-dihydroxy-2,3-dimethyl-1,2,3,4,4a,5,8,8a-octahydro-5,8-methano-2,3-naphthalenedicarboxylic acid, polyphenylene oxide and 1,4-dihydroxy-2,3-dimethyl-1,2,3,4,4,a,5,8,8a-octahydro-5,8-methano-2,3-naphthalenedicarboxylic acid, etc., as well as the corresponding polybromo-substituted acids and anhydrides thereof. It is to be understood that the aforementioned novel compositions of matter are only representative of the class of compositions of matter of the present invention, and that said invention is not necessarily limited thereto.

The following examples are given to illustrate the novel compositions of matter of the present invention, which examples, however, are not intended to limit the generally broad scope of the present invention in strict accordance therewith.

EXAMPLE I

In this example 2 moles of maleic anhydride are dissolved in about 600 cc. of anhydrous ethyl ether at a temperature of about 30° C. Following this, 2 moles of furan are then added. The resulting pale yellow solution is allowed to stand for 16 hours whereby the product is deposited as well-formed crystals. The crystals are separated from the solution, said crystals comprising 3,6-epoxy-1,2,3,6-tetrahydrophthalic anhydride.

The 3,6-epoxy-1,2,3,6-tetrahydrophthalic anhydride which is prepared according to the above paragraph is then mixed with a molecular proportion of hexachlorocyclopentadiene in a xylene solvent. This mixture is heated to a temperature of about 150° C. and maintained thereat for a period of about 2 hours. At the end of this time the flask and contents thereof are allowed to cool to room temperature and the product is subjected to fractional crystallization. The desired product comprising 5,6,7,8,9,9-hexachloro-1,2,3,4,4a,5,8,8a-octahydro-1,4-epoxy-5,8-methano-2,3-naphthalenedicarboxylic acid anhydride is separated and recovered.

The acid anhydride prepared according to the above paragraph is then placed in a reaction vessel along with an excess of dilute sulfuric acid. The mixture is heated to a temperature of about 50° C. for a period of about 2 hours. At the end of this time the flask and contents thereof are allowed to cool to room temperature and the desired product comprising 1,4-dihydroxy-5,6,7,8,9,9-hexachloro-1,2,3,4,4a,5,8,8a-octahydro-5,8-methano-2,3-naphthalenedicarboxylic acid is separated and recovered by fractional crystallization.

EXAMPLE II

In this Example 2 moles of maleic anhydride are dissolved in anhydrous ethyl ether and 2 moles of furan are added thereto. The solution is allowed to stand for 16 hours during which time crystals are formed. The crystals are separated from the mother liquor and purified.

Following this, equimolar proportions of the anhydride and hexabromocyclopentadiene are placed in a condensation flask along with xylene and heated to a temperature of 150° to 165° C. for a period of about 6 hours. At the end of this time the flask and contents are cooled to room temperature and the condensation product comprising 5,6,7,8,9,9-hexabromo-1,2,3,4,4a-5,8,8a-octahydro-1,4-epoxy-5,8-methano-2,3-naphthalenedicarboxylic acid anhydride is separated and recovered by fractional crystallization.

The anhydride prepared according to the above paragraph is placed in a reaction vessel along with an excess of dilute sulfuric acid and treated in a manner similar to that set forth in Example I above. The desired product comprising 1,4-dihydroxy-5,6,7,8,9,9-hexabromo-1,2,3,4a,5,8,8a-octahydro-5,8-methano-2,3-naphthalenedicarboxylic acid is separated and recovered by fractional crystallization.

EXAMPLE III

In this example 5,6,7,8,9,9-hexachloro-1,2,3,4,4a-5,8,8a-octahydro-1,4-epoxy-5,8-methano-2,3-naphthalenedicarboxylic acid anhydride which is prepared according to the process set forth in Example I above is treated with various aqueous acids such as phosphoric acid and methane-sulfonic acid at temperatures ranging from 50° to 100° C., the desired product comprising 1,4-dihydroxy-5,6,7,8,9,9-hexachloro-1,2,3,4,4a,5,8,8a-octahydro-5,8-methano-2,3-naphthalenedicarboxylic acid being recovered in each case.

EXAMPLE IV

As an illustration of a novel flame retardant composition of matter of the present invention a polyester resin may be prepared by charging equimolar of ethyleneglycol and diethyleneglycol to a flask which is then swept with nitrogen and heated to a temperature of between 90° and 100° C. Following this maleic anhydride and 1,4-dihydroxy-5,6,7,8,9,9-hexachloro-1,2,3,4,4a,5,8,8a-octahydro-5,8-methano-2,3-naphthalenedicarboxylic acid are then added to the flask which is thereafter heated to a temperature of about 106° C. The flask is maintained at a temperature in the range of from about 165° to about 175° C. for a period of about 6 hours. At the end of this time heating is discontinued, the flask is allowed to return to room temperature, and the novel flame retardant composition of matter is recovered. The resin is cured and cut into strips. In addition another polyester resin which does not contain the 1,4-dihydroxy-5,6,7,8,9,9-hexachloro-1,2,3,4,4a,5,8,8a-octahydro-5,8-methano-2,3-naphthalenedicarboxylic acid is also prepared and cut into strips. The strips which contain the dihydroxychloro substituted acid are marked A and the strips which do not contain this acid component are marked B. When the two sets of strips are subjected to a flammability test it will be found that the oxygen index (the lowest mole amount of oxygen sufficient to maintain combustion) of the strips which contain the dihydroxypolychloro substituted acid will be considerably higher than those strips which do not contain the aforesaid acid.

EXAMPLE V

In this example a polyester resin may be prepared by charging ethylene glycol to a reaction vessel which is thereafter swept with nitrogen. The flask is heated to a temperature in the range of from about 90° to about 100° C. and some 1,4-dihydroxy-5,6,7,8,9,9-hexabromo-1,2,3,4,4a,5,8,8a-octahydro-5,8-methano-2,3-naphthalenedicarboxylic acid is added thereto. Following this, diethylene glycol which is preheated to a temperature of about 80° C. is added thereto, followed by the addition of more of the acid. The temperature of the flask is then raised and maintained in a range of from about 165° to about 175° C. At the end of about 8 hours, maleic anhydride is added and the reaction is allowed to proceed for an additional period of 8 hours. At the end of this time the resin is recovered and is further treated by the addition of styrene. The mixture is heated to a temperature of about 70° to about 90° C. and maintained thereat for a period of about 2 hours. At the end of this time the polyester resin resulting from the admixture of the styrene and the previously prepared resin is recovered.

When the strips of this resin are compared to strips of resin which do not contain the dihydroxy hexabromo substituted acid in a flammability test it will be found that the former strips will possess an oxygen index considerably higher than that which is possessed by the strips which do not contain the acid.

EXAMPLE VI

A liquid epoxy resin having an epoxide equivalent weight of 190 and known in the trade as "Epon 828" is admixed with 1,4-dihydroxy-5,6,7,8,9,9-hexachloro-1,2,3,4,4a,5,8,8a-octahydro-5,8-methano-2,3-naphthalenedicarboxylic acid and phthalic anhydride. The resulting mixture is then heated until said mixture becomes homogenous and is thereafter poured into molds which are prepared from glass sheets using Teflon spacers. In addition, a mold release agent is also used to facilitate the removal of the cured resin from the mold. The molds are placed in an air-circulating oven and allowed to cure for a period of about 6 hours at a temperature of about 110° C. The sheets are then removed from the mold, cut into strips, and are evaluated for flame retardancy. In addition to possessing excellent heat distortion temperatures and hardness, as measured by a Shore durometer, the cured resin will be found to be self-extinguishing when removed from the direct action of a flame.

EXAMPLE VII

In like manner, a mixture is made by admixing a polymer comprising a polyphenyl ether (polyphenylene oxide) which has been modified with styrene and 1,4-dihydroxy-2,3-diphenyl-5,6,7,8,9,9-hexachloro-1,2,3,4,4a,5,8,8-octahydro-5,8-methano-2,3-naphthalenedicarboxylic anhydride, said compounds being admixed at an elevated temperature in order to insure that the mixture is homogenous. After the mixture is poured into molds and allowed to cool, the resulting composition of matter is removed, and upon testing, will be found to be self-extinguishing when removed from the direct action of a flame.

EXAMPLE VIII

In this example, a mixture comprising a commercial high molecular weight polypropylene and 1,4-dihydroxy-5,6,7,8,9,9-hexachloro-1,2,3,4,4a,5,8,8a-octahydro-5,8-methano-2,3-naphthalenedicarboxylic anhydride are admixed in a milling machine along with a commercial antioxidant, the final composition of matter containing about 85 weight percent of polypropylene and 15 weight percent of the antioxidant. After admixing for a period of about 5 minutes at 185° C., the resulting composite is cut into strips, said strips containing a glass cloth in the center of the strips to prevent dripping during the combustion test. A high molecular weight polypropylene which does not contain any anhydride but only the antioxidant is also cut into strips similar in nature to those hereinbefore described. The strips are then burned in an apparatus similar to one which is described by C. P. Fenimore and J. F. Martin in the Nov. 1966 issue of *Modern Plastics*.

Upon completion of the burning tests, it will be found that the strip of polypropylene which does not contain any additive possesses a relatively low oxygen index and a rapid rate of burning while the polypropylene strip which contained the anhydride will possess a higher oxygen index and a much slower rate of burning.

EXAMPLE IX

In this example, polyurethane foam is prepared and divided into two parts. One part has added thereto a sufficient amount of 1,4-dihydroxy-5,6,7,8,9,9-hexachloro-1,2,3,4,4a,5,8,8a-octahydro-5,8-methano-2,3-naphthalenedicarboxylic anhydride in an amount sufficient so that the foam will contain about 3.5 percent chlorine. The foams are then subjected to a burning test utilizing the process set forth in the ASTM 1692-59T method of determining flammability data. It will be found that the foam which contains the additive will have a much lower flammability rate, that is, it will take a relatively longer period of time for the foam to burn the necessary distance than will the foam which does not contain any additive.

Likewise, polycarbonates, polymethol methacrylate which contain the halo-substituted 1,4-dihydroxypolyhydromethanonaphthalenedicarboxylic acid or anhydride thereof, when subjected to flammability tests, will be found to exhibit a higher degree of flame retardancy, will have a higher oxygen index, and will also exhibit greater stability as regards color deterioration when exposed to the direct action of sunlight over an extended period of time than will compounds or polymers which do not contain this additive.

I claim as my invention:

1. A flame retardant composition of matter comprising a natural or synthetic polymer and as the flame retardant a compound which possesses the generic formula:

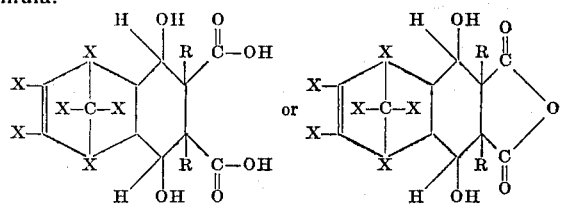

in which each R is independently selected from the group consisting of hydrogen, alkyl, aryl and halogen and each X is independently selected from the group consisting of hydrogen and halogen, at least 2 X's being halogen, the aforesaid halogen being either chlorine or bromine.

2. The composition of matter as set forth in claim 1 in which said polymer is polyethylene.

3. The composition of matter as set forth in claim 1 in which said polymer is polypropylene.

4. The composition of matter as set forth in claim 1 in which said polymer is a co-polymer of acrylonitrile, butadiene, and styrene.

5. The composition of matter as set forth in claim 1 in which said polymer is an epoxy resin.

6. The composition of matter as set forth in claim 1 in which said polymer is a polyester.

7. The composition of matter as set forth in claim 1 in which said acid is 1,4-dihydroxy-5,6,7,8,9,9-hexachloro-1,2,3,4,4a,5,8,8a-octahydro-5,8-methano-2,3-naphthalenedicarboxylic acid.

8. The composition of matter as set forth in claim 1 in which said anhydride is 1,4-dihydroxy-5,6,7,8,9,9-hexachloro-1,2,3,4,4a,5,8,8a-octahydro-5,8-methano-2,3-naphthalenedicarboxylic anhydride.

9. The composition of matter as set forth in claim 1 in which said acid is 1,4-dihydroxy-5,6,7,8,9,9-hexabromo-1,2,3,4,4a,5,8,8a-octahydro-5,8-methano-2,3-naphthalenedicarboxylic acid.

10. The composition of matter as set forth in claim 1 in which said acid is 1,4-dihydroxy-2,3-dimethyl-5,6,7,8,9,9-hexachloro-1,2,3,4,4a,5,8,8a-octahydro-5,8-methano-2,3-naphthalenedicarboxylic acid.

11. The composition of matter as set forth in claim 1 in which said anhydride is 1,4-dihydroxy-2,3-diphenyl-5,6,7,8,9,9-hexachloro-1,2,3,4,4a,5,8,8a-octahydro-5,8-methano-2,3-naphthalenedicarboxylic anhydride.

* * * * *